US008910665B2

(12) United States Patent
Carter et al.

(10) Patent No.: US 8,910,665 B2
(45) Date of Patent: Dec. 16, 2014

(54) METHODS AND APPARATUS FOR BYPASSING A POSITIONER IN AN ACTIVE CONTROL LOOP

(75) Inventors: Perry Keith Carter, Ames, IA (US); Bruce Frederick Grumstrup, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 527 days.

(21) Appl. No.: 13/037,031

(22) Filed: Feb. 28, 2011

(65) Prior Publication Data

US 2012/0216898 A1 Aug. 30, 2012

(51) Int. Cl.
*F16K 31/00* (2006.01)
*F15B 11/068* (2006.01)
*F15B 20/00* (2006.01)

(52) U.S. Cl.
CPC ............. *F15B 20/008* (2013.01); *F15B 11/068* (2013.01); *F15B 2211/8636* (2013.01); *F15B 2211/3138* (2013.01); *F15B 2211/8752* (2013.01); *F15B 2211/30565* (2013.01); *F15B 2211/85* (2013.01); *F15B 2211/31529* (2013.01)
USPC ................. 137/883; 137/599.09; 137/599.11; 137/601.01

(58) Field of Classification Search
CPC ................. F15B 11/068; F15B 20/008; F15B 2211/30565; F15B 2211/8753; F15B 2211/31529; F15B 2211/85; F15B 2211/8636; F15B 2211/3138; G05D 23/1856
USPC ................... 137/599.09, 599.11, 601.01, 883
See application file for complete search history.

(56) References Cited

U.S. PATENT DOCUMENTS

| | | | | |
|---|---|---|---|---|
| 2,369,887 | A | 2/1945 | Eckman | |
| 2,528,735 | A | 11/1950 | Bristol | |
| 2,911,954 | A | 11/1959 | Huston et al. | |
| 3,879,984 | A * | 4/1975 | Welland | 73/23.24 |
| 4,565,207 | A * | 1/1986 | Sherrod | 137/1 |
| 4,819,543 | A * | 4/1989 | Leinen | 91/363 R |
| 5,209,258 | A * | 5/1993 | Sharp et al. | 137/343 |
| 6,460,563 | B2 * | 10/2002 | Olson et al. | 137/364 |
| 6,834,662 | B1 * | 12/2004 | Olson et al. | 137/15.18 |
| 6,953,047 | B2 * | 10/2005 | Birtcher et al. | 137/240 |

OTHER PUBLICATIONS

International Searching Authority, "Written Opinion," issued in connection with International Application No. PCT/US2011/065813, mailed on Apr. 3, 2012, 6 pages.
International Searching Authority, "Search Report," issued in connection with International Application No. PCT/US2011/065813, mailed on Apr. 3, 2012, 2 pages.

* cited by examiner

*Primary Examiner* — Craig Schneider
(74) *Attorney, Agent, or Firm* — Hanley, Flight & Zimmerman, LLC

(57) ABSTRACT

Methods and apparatus for bypassing a positioner in an active control loop are described. An example actuator assembly includes a pneumatic actuator and a transfer station. The transfer station includes a body defining flow paths that enable fluid to flow between a supply pressure, a valve positioner, and the pneumatic actuator and between the supply pressure and the pneumatic actuator to bypass the valve positioner without disrupting a process loop including the valve positioner. The transfer station also includes a plurality of fluid flow control devices to control the fluid flow through the flow paths.

17 Claims, 4 Drawing Sheets

METHODS AND APPARATUS FOR BYPASSING A POSITIONER IN AN ACTIVE CONTROL LOOP

FIELD OF THE DISCLOSURE

This patent relates to pneumatic positioners and, more specifically, to methods and apparatus for bypassing a positioner in an active control loop.

BACKGROUND

Process control systems use a variety of field devices to control process parameters. Valve positioners are commonly used in connection with valve assemblies to control the position of an actuator and/or valve. When these valve positioners are repaired and/or replaced, the process loop may have to be deactivated or shutdown or may be disrupted such that the position of the actuator and/or valve is fixed and may not be adjusted.

SUMMARY

An example transfer station for use with a valve positioner includes a body defining first, second, and third flow paths, the first flow path enabling fluid to flow from a supply pressure to a valve positioner coupled to the body during a normal operation mode, the second flow path enabling fluid to flow from the valve positioner to an actuator coupled to the body during the normal operation mode, and the third flow path enabling fluid to flow between the first and second flow paths during a bypass operation mode that bypasses the valve positioner. The transfer station also includes a plurality of fluid flow control devices to control fluid flow between the supply pressure and the valve positioner and between the valve positioner and the actuator during the normal operation mode and between first and second flow paths during the bypass operation mode. The bypass operation mode enabling manual control of a process loop while the valve positioner is not controlling the process loop.

An example actuator assembly includes a pneumatic actuator and a transfer station. The transfer station includes a body defining flow paths that enable fluid to flow between a supply pressure, a valve positioner, and the pneumatic actuator and between the supply pressure and the pneumatic actuator to bypass the valve positioner without disrupting a process loop including the valve positioner. The transfer station also includes a plurality of fluid flow control devices to control the fluid flow through the flow paths.

An example method of enabling a positioner to be bypassed includes adjusting a regulator output pressure to be similar to a positioner output and bypassing the positioner and enabling manual control of an actuator associated with the process loop using the regulator. The method also includes balancing the positioner output with the regulated output pressure and reenabling control of the actuator by the positioner or another positioner.

DETAILED DESCRIPTION

Figure 1:
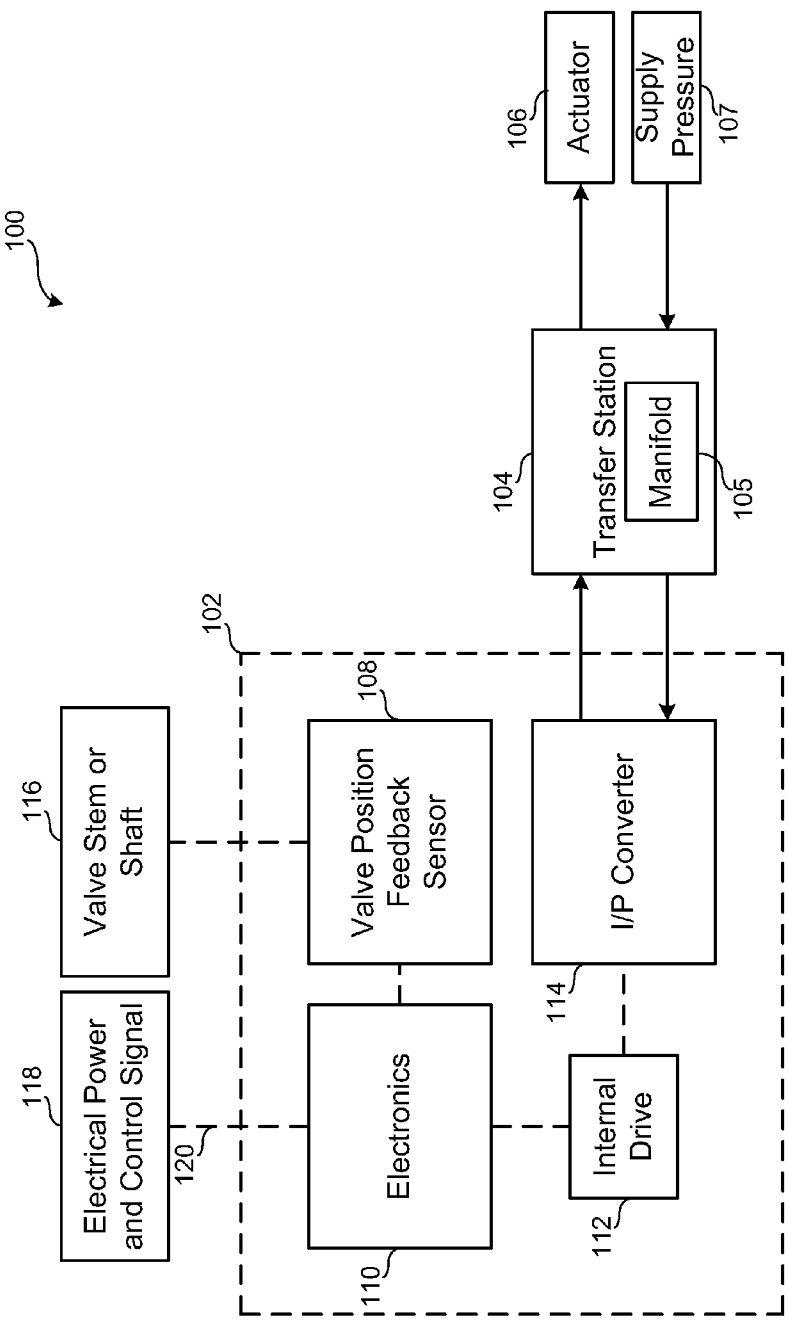
FIG. 1 depicts a portion of an example control valve assembly.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to example methods and apparatus that enable pneumatic and/or electro-pneumatic positioners (e.g., valve positioners) and/or associated components (e.g., electronics board(s), I/P conversion module(s), pneumatic relay(s), pneumatic spool valve(s), internal sensor(s), etc.) to be repaired, replaced and/or otherwise serviced without disrupting, upsetting, etc., an active or operational process loop. In contrast to some known approaches that fix (e.g., mechanically fix or pneumatically fix) a control valve during such repairs and/or replacements, the example methods and apparatus enable control valves to maintain control of an active process loop while any associated valve positioner(s) (e.g., a main positioner) and/or components are being repaired, replaced and/or otherwise serviced.

In some examples, a transfer station enables supply pressure that typically flows to a valve positioner to bypass the valve positioner and be rerouted directly to an actuator coupled thereto. When the transfer station operates in a bypass mode, one or more pressure regulators internal and/or external to the transfer station may enable manual control of a pneumatic actuator as well as any end devices (e.g., a valve coupled thereto). Thus, using the example transfer station, control of, for example, a valve position may be maintained when a valve positioner that is normally operatively coupled to the valve is bypassed and, thus, operatively decoupled from an otherwise active process loop.

In some examples, the transfer station includes a manifold having three flow paths enabling fluid flow between a pressure supply and a valve positioner, between the valve positioner and an actuator and between the pressure supply and the actuator such that the valve positioner is bypassed. The example transfer station may also include a plurality of fluid control devices (e.g., valves) that control fluid flow through the flow paths in the manifold.

During a normal operation mode, the fluid control devices may enable fluid flow (e.g., the routing of a source of pressurized air) through a valve positioner and prevent fluid flow through a bypass flow path. During a bypass operation mode, the fluid control devices may enable fluid flow through the bypass flow path and prevent fluid flow to and/or through the valve positioner. By bypassing the valve positioner, the valve positioner may be repaired and/or replaced without venting the supply pressure to the atmosphere, for example. During a balancing operation mode, the fluid control devices may enable fluid flow to the valve positioner, prevent fluid flow from the valve positioner and enable fluid flow through the bypass flow path. The balancing operation mode may enable the output pressure of the valve positioner to be balanced with and/or matched to the fluid pressure flowing to the actuator prior to the valve positioner resuming control of the process loop. If the output pressure of the valve positioner is substantially different than the fluid pressure flowing to the actuator when the valve positioner resumes control of the process loop, a pressure change occurs that causes a position of a control valve coupled to the actuator to change.

To repair and/or replace a valve positioner coupled to an example transfer station, an operator may fix an output pressure of the valve positioner. The output pressure of the valve positioner may be fixed by fixing a control signal set-point (e.g., an analog signal, a digital signal) and/or by fixing an internal drive to a current-to-pneumatic (I/P) converter. Using an external supply regulator, the operator may reduce a fluid pressure flowing into the transfer station until a fluid pressure flowing out of the transfer station and to an actuator coupled thereto changes and/or is similar to the pressure flowing into the transfer station. If the transfer station includes an internal regulator, the operator may instead adjust the internal regulator until the regulator output pressure is similar to and/or matches a pressure of the fluid flowing out of the transfer station. During such pressure adjustments, one or more pressure gauges may be used to monitor the pressure(s) within the different flow paths of the transfer station.

Once the pressures are similar and/or substantially equal, the operator may switch the operation mode from a normal operation mode, in which fluid flows into and out of the valve positioner, to a bypass operation mode in which the fluid flow bypasses the valve positioner. In the bypass operation mode, the valve positioner may be repaired and/or replaced without bleeding or venting supply pressure to the atmosphere. A position of a control valve coupled to the actuator may be changed using an external regulator and/or an internal regulator. For example, the regulator (e.g., an external and/or internal regulator) may be adjusted such that a pressure of the fluid flowing to the actuator increases and/or decreases which, in turn, changes a position of the control valve.

After the valve positioner has been repaired and/or replaced, the operator may switch the operation mode from the bypass operation mode, in which fluid flow bypasses the valve positioner, to a balance operation mode in which the regulator (e.g., external and/or internal regulator) maintains control of the process loop but supply pressure also flows into the valve positioner in preparation of transferring control of the process loop back to the valve positioner. In the balance operation mode, an output pressure of the valve positioner is balanced with a fluid pressure flowing to the actuator (e.g., a regulator output pressure, a regulated output pressure). The output pressure of the valve positioner may be balanced with the fluid pressure flowing to the actuator by changing a control signal set-point (e.g., analog signal, digital signal) and/or by changing an internal drive to an I/P converter, for example.

The operator may then switch the operation mode from the balance operation mode to the normal operation mode in which the valve positioner controls the process loop. If the transfer station uses an external supply regulator to control a position of the actuator in the bypass and balance operation modes, the operator may adjust the external regulator to change the pressure of the fluid flowing into the transfer station back to a normal operating pressure.

FIG. 1 depicts a portion of an example control valve assembly 100 including a positioner 102, an example transfer station 104 having a manifold 105, and an actuator 106 that may be coupled to a valve or other fluid control device (not shown). The positioner 102 and the actuator 106 may be physically and/or communicatively coupled together within the example control valve assembly 100 via the transfer station 104. The transfer station 104 may be integrally coupled to the actuator 106.

The transfer station 104 may be operatively coupled between the positioner 102 and the actuator 106 to enable the positioner 102 to be repaired and/or replaced without substantially disrupting any active process loop in which the control valve assembly 100 is operative. The manifold 105 may define and/or include a plurality of flow paths and/or lines. One or more of the flow paths may flow pressurized air and/or fluid from a source of supply pressure 107 to the positioner 102. Another one of the flow paths may flow pressurized air and/or fluid from the positioner 102 to the actuator 106 to control a position of the actuator 106 and, in turn, any control device (e.g., a valve) coupled thereto. Another one of the flow paths may bypass the positioner 102 such that pressurized air and/or fluid received from the source of supply pressure 107 is routed directly to the actuator 106 such that the positioner 102 is bypassed.

The transfer station 104 may also include a plurality of fluid control devices (e.g., valves) to control fluid flow through the flow paths, a plurality of pressure gauges to enable the monitoring of fluid pressure within the flow paths and/or regulators (e.g., internal and/or external to the transfer station 104) that may be used to regulate pressure of fluid flowing to the positioner 102, fluid flowing from the positioner 102 to the actuator 106 and/or fluid bypassing the positioner 102 and flowing directly to the actuator 106, for example. The one or more regulators and/or the transfer station 104 enable control of the valve coupled to the actuator 106 to be maintained even when the positioner 102 is bypassed. In this manner, the one or more regulators and/or the transfer station 104 enable the positioner 102 to be bypassed without disrupting a process loop.

The positioner 102 may include a valve position feedback sensor 108, electronics 110, an internal drive 112 and a current-to-pneumatic conversion component (e.g., an I/P converter) 114. The positioner 102 controls the position of the valve coupled to the actuator 106 using one or more of the components 108-114 and/or other information and/or signals received. More specifically, the valve position feedback sensor 108 of the positioner 102 may receive information related to a position of a valve stem or shaft 116. The information received may be used by the positioner 102 to control the position of and the flow rate through the valve.

Information regarding the valve position may be conveyed to the valve position feedback sensor 108 using mechanical linkage, a magnetic field, potentiometer, magnetic sensor array, etc. The valve position feedback sensor 108 may generate and/or provide a feedback signal to the electronics 110. The feedback signal may represent a position of the actuator 106 coupled to the valve, a position of the valve stem or shaft and/or a position of a flow control member (e.g., valve plug) relative to a valve seat (e.g., an open position, a closed position, an intermediate position, etc.).

Electrical power and/or control signal(s) 118 may be received by the electronics 110 via a communication path 120. The communication path 120 may be a wired communication path and/or a wireless communication path. The electronics 110 may receive a feedback signal from the valve position feedback sensor 108 and a control signal (e.g., the electrical power and control signal 118) originating from a controller in a process control system. The control signal may be used by the electronics 110 as a set-point or reference signal that corresponds to a desired valve position. Once received, the electronics 110 may compare a feedback signal value to a control signal value to determine a difference between the values. Any difference between the values may be associated with an amount that the position of the actuator 106 is to be changed by the positioner 102, for example.

To change the position of the actuator 106 based on a difference between the feedback signal value and the control signal value, a current may be generated by the internal drive 112 and conveyed to the I/P converter 114. The I/P converter 114 may generate a pneumatic pressure (based on a current received) that flows through the manifold 105 to the actuator 106 to change the position of the actuator 106.

Figure 2:
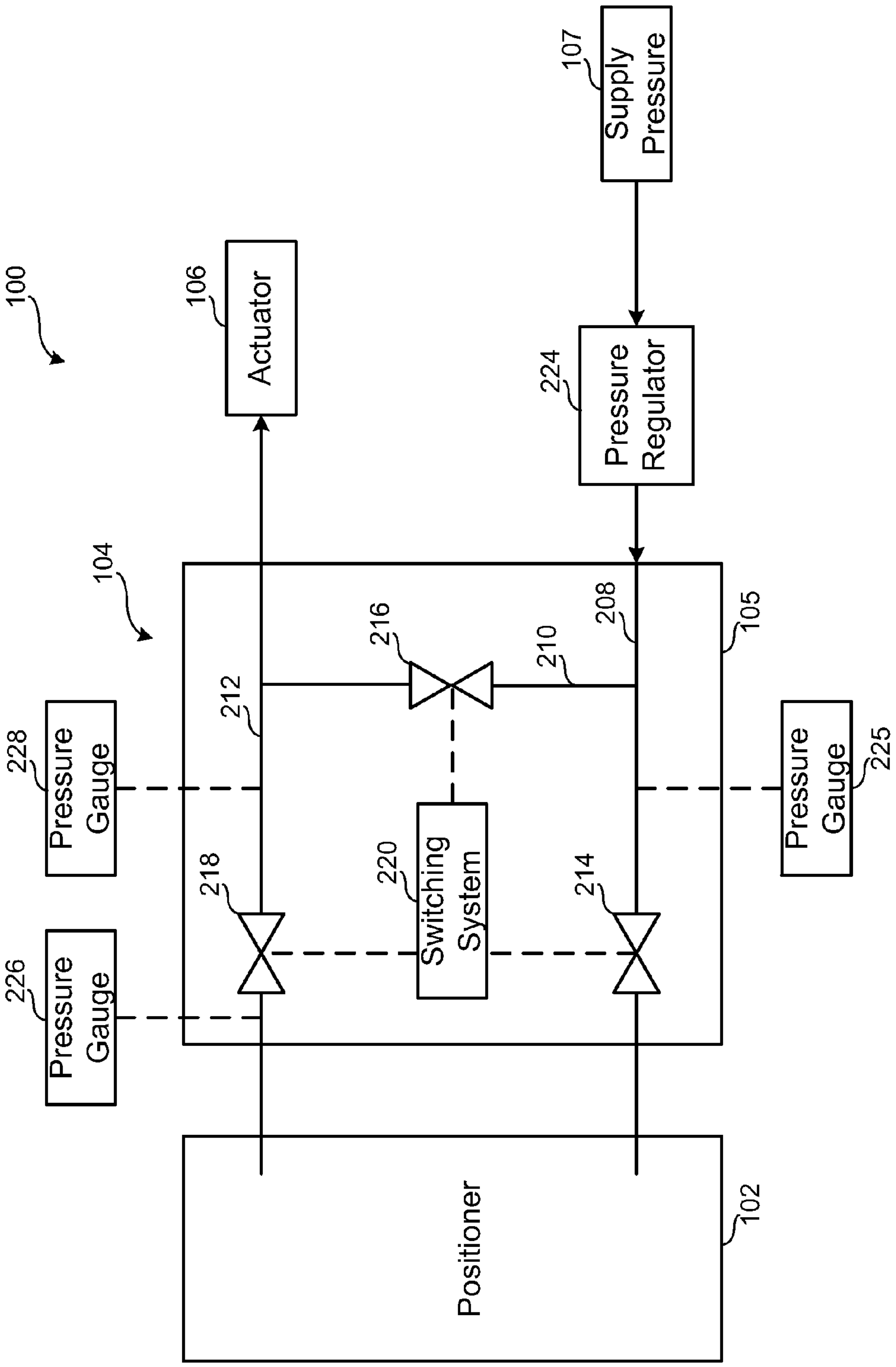
FIG. 2 depicts the portion of the control valve assembly of FIG. 1 including a more detailed schematic view of an example transfer station.

FIG. 2 is a more detailed schematic view of a portion of the control valve assembly 100 of FIG. 1. The manifold 105 of the transfer station 104 includes a first flow path 208, a second flow path 210 and a third flow path 212. The manifold 105 additionally includes first through third fluid flow control devices and/or valves 214-218 to control fluid flow through the flow paths 208-212, respectively. The transfer station 204 may also include a switching system 220 that may be operatively and/or communicatively coupled to the valves 214-218 to control the opening and/or closing of the valves 214-218 based on an operation mode selected, for example.

In a normal operation mode, the first and third valves 214 and 218 are open while the second valve 216 is closed, enabling fluid flow from the source of supply pressure 107, through a supply pressure regulator 224, through the first flow path 208, the positioner 102 and the third flow path 212 to the actuator 106. In the normal operation mode, the positioner 102 is used to control the position of the actuator 106.

In a bypass operation mode, the first and third valves 214 and 218 are closed and the second valve 216 is open, enabling fluid flow from the source of supply pressure 107, through the supply pressure regulator 224, through the first flow path 208, the second flow path 210 bypassing the positioner 102 to the third flow path 212 and the actuator 106. In the bypass operation mode, the supply pressure regulator 224 may be used to control the position of the actuator 106 by regulating a pressure of the fluid being supplied to the actuator 106.

In a balancing operation mode, the first and second valves 214 and 216 are open and the third valve 218 is closed, enabling fluid flow from the source of supply pressure 107, through the supply pressure regulator 224, through the first flow path 208, the second flow path 210 and the third flow path 212 to the actuator 106 while also flowing fluid into but not out of the positioner 102. The balancing operation mode enables an output pressure of the positioner 102 to be balanced and/or matched with a pressure within the third flow path 212 prior to the positioner 102 resuming control of a process loop. In the balancing operation mode, the supply pressure regulator 224 may be used to control the position of the actuator 106 by regulating a pressure of the fluid being supplied to the actuator 106.

To repair and/or replace the positioner 102, an operator may fix an output pressure of the positioner 102. The operator may then reduce the pressure of fluid flowing into the first flow path 208 using the supply pressure regulator 224 until a pressure of fluid flowing into the positioner 102 (e.g., the pressure within the first flow path 208) is similar to the pressure of the fluid flowing out of the positioner (e.g., the pressure within the third flow path 212). The operator may monitor the fluid pressure within the first flow path 208 using a first pressure gauge 225 and the fluid pressure within the third flow path 212 using second and/or third pressure gauges 226 and/or 228.

If the pressures within the first and third flow paths 208 and 212 are similar or substantially equal, the operator may switch the operation mode from the normal operation mode to the bypass operation mode using the switching system 220. In the bypass operation mode, the first and third valves 214 and 218 are in the closed position and the second valve 216 is the open position such that the positioner 102 is bypassed. In the bypass operation mode, the positioner 102 may be removed, repaired, replaced etc. and the supply pressure regulator 224 may be used to adjust the position of the actuator 106 by controlling the pressure of fluid supplied to the actuator 106.

After the positioner 102 has been repaired and/or replaced, the operator may switch the operation mode from the bypass operation mode to the balance operation mode using the switching system 220. In the balance operation mode, the first and second valves 214 and 216 are in the open position and the third valve 218 is in the closed position such that the fluid flowing to the actuator 106 is flowing from the second flow path 210 and not from the positioner 102. In the balance operation mode, an output pressure of the positioner 102 is balanced and/or made similar to an output pressure of the supply pressure regulator 224 (e.g., the regulated output pressure). The operator may monitor the output pressure of the positioner 102 using the second pressure gauge 226 and may monitor the output pressure of the supply pressure regulator 224 using the first and/or third pressure gauges 225 and/or 228. In the balance operation mode, the supply pressure regulator 224 may be used to adjust the position of the actuator 106 by controlling the pressure of fluid being supplied to the actuator 106.

If the pressures on both sides of the third valve 218 are similar and/or substantially equal, the operator may switch the operation mode from the balance operation mode to the normal operation mode using the switching system 220. The operator may also increase the pressure of fluid flowing into the first flow path 208 back to a normal operating pressure using the supply pressure regulator 224. In the normal operation mode, the positioner 102 is used to control the position of the actuator 106.

Figure 3:
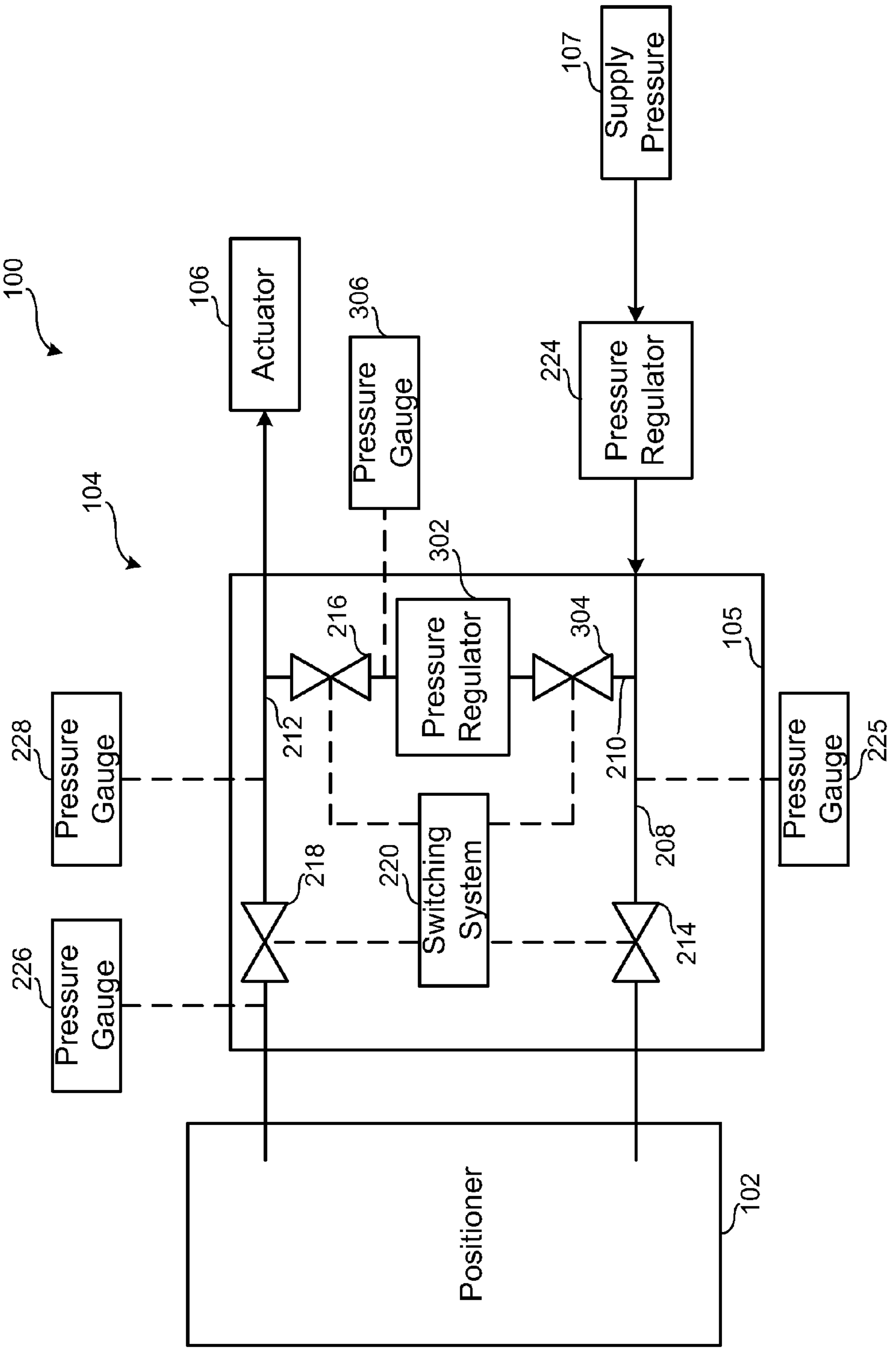
FIG. 3 depicts the portion of the control valve assembly of FIG. 1 including a more detailed schematic view of another example transfer station.

FIG. 3 is alternative more detailed schematic view of the control valve assembly of FIG. 1. In contrast to the example described in connection with FIG. 2, the example of FIG. 3 may include a pressure regulator 302 coupled to the second flow path 210 and a fourth fluid flow control device or valve 304. However, in some examples, the control valve assembly 100 may not include the fourth valve 304.

The pressure regulator 302 may be used to control a position of the actuator 106 during the bypass operation mode by regulating a pressure of fluid supplied to the actuator 106. The pressure regulator 302 may enable a change from the normal operation mode to the bypass operation mode with relatively little if any change in the fluid pressure supplied to the actuator 106 and, thus, little, if any, undesired change may occur in the valve position.

In the normal operation mode, the first and third valves 214 and 218 are in the open position and the second and fourth valves 216 and 304 are in the closed position. In the bypass operation mode, the first and third valves 214 and 218 are in the closed position and the second and fourth valves 216 and 304 are in the open position such that the positioner 102 is bypassed. In the balance operation mode, the first, second and fourth valves 214, 216 and 304 are in the open position and the third valve 218 is in the closed position such that the fluid flowing to the actuator 106 is flowing from the second flow path 210 and not from the positioner 102.

To repair and/or replace the positioner 102, an operator may perform similar procedures as discussed above in connection with FIG. 2. However, some differences exist as described below. In the control valve assembly 100 of FIG. 3, after the output pressure of the positioner 102 is fixed, an operator may open the fourth valve 304 using the switching system 220 to enable fluid flow through the pressure regulator 302. Then, the operator may adjust the pressure regulator 302 such that an output pressure of the pressure regulator 302 is similar to and/or matches an output pressure of the positioner 102. The operator may monitor the output pressure of the pressure regulator 302 using a fourth pressure gauge 306 and may monitor the output pressure of the positioner 102 using the second and/or third pressure gauges 226 and/or 228.

In the bypass operation mode of the control valve assembly 100 of FIG. 3, the pressure regulator 302 may be used to adjust the position of the actuator 106 by controlling the pressure of fluid supplied to the actuator 106. In the balance operation mode of the control valve assembly 100 of FIG. 3, an output pressure of the positioner 102 is balanced and/or made similar to an output pressure of the pressure regulator 302 (e.g., regulated output pressure). The operator may monitor the output pressure of the positioner 102 using the second pressure gauge 226 and may monitor the output pressure of the pressure regulator 302 using the third and/or fourth pressure gauges 228 and/or 306.

Figure 4:
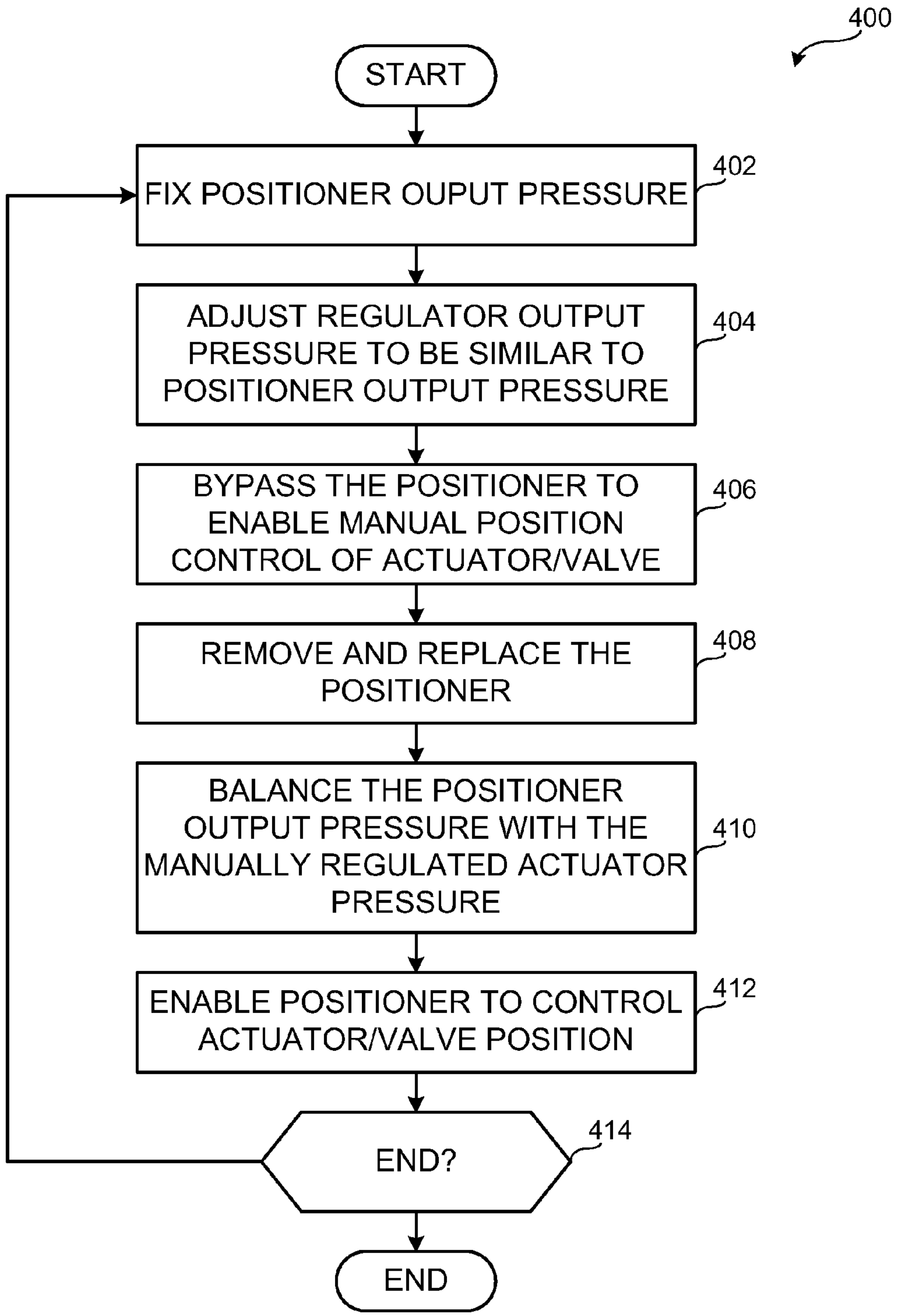
FIG. 4 depicts an example flow chart that may be used to implement the examples described herein.

Positioners used in connection with control valve assemblies may include components (e.g., electronics) that may need to be periodically repaired, replaced and/or otherwise serviced. FIG. 4 depicts an example method 400 describing procedures that an operator may perform to bypass a positioner in an active process loop while enabling control of the process loop to be maintained. While the below method 400 is described using reference numbers of FIGS. 2 and 3, the method 400 is equally applicable to all of the examples described herein.

The method 400 may begin by the operator fixing the positioner 102 output pressure. (block 402). The positioner 102 output pressure may be fixed by fixing a control signal set-point (e.g., analog signal, digital signal) and/or by fixing an internal drive to an I/P converter, for example. The operator may then adjust the regulator 224 or 302 output pressure to be similar to the positioner 102 output pressure. (block 404). The regulator 224 or 302 may be integral to the transfer station 104 or external to the transfer station 104. If the transfer station 104 includes the fourth valve 304, the operator may open the fourth valve 304 using the switching system 220 prior to adjusting the regulator 302 output pressure.

If the operator determines that the regulator 224 or 302 output pressure is similar to the positioner 102 output pressure, control advances to block 406 and the operator, using the switching system 220, may change the operation mode to bypass operation mode to bypass the positioner and enable manual position control of the actuator/valve. (block 406). One or more regulators 224 or 302 may be used to manually adjust the position of the actuator/valve when the positioner 102 is bypassed.

When the positioner 102 is bypassed, the operator may remove, replace or other service the positioner 102. (block 408). With the positioner 102 repaired and/or replaced, the operator, using the switching system 220, may change the operation mode to balance operation mode to balance the positioner 102 output pressure with the manually regulated output pressure prior to the positioner 102 resuming control of the process loop. (block 410). The positioner 102 output pressure may be balanced with the regulated output pressure by changing the control signal set-point (e.g., analog signal, digital signal) and/or by changing an internal drive to the I/P converter. If the operator determines that the pressures are balanced, control moves to block 412 and the operator, using the switching system 220, may change the operation mode to normal operation mode to enable the positioner 102 to control the actuator/valve position. At block 414, the method 400 determines whether or not to return to block 402. Otherwise, the example method 400 is ended.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:

a single-body manifold configured as a coupling interface between a pneumatic actuator and a valve positioner, the manifold defining first, second, and third flow paths and first and second ports coupled to the second flow path, the first port to be coupled to a first pressure gauge, the second port to be coupled to a second pressure gauge, the first flow path to enable fluid to flow between a supply pressure and the valve positioner, the second flow path to enable fluid to flow between the valve positioner and the pneumatic actuator and the third flow path to enable fluid to flow between the supply pressure and the pneumatic actuator to bypass the valve positioner without disrupting a process loop including the valve positioner; and first, second, and third fluid flow control devices positioned within the manifold to control the fluid flow through the respective first, second, and third flow paths, the second fluid flow control device positioned between the first and second ports.

2. The transfer station of claim 1, wherein the positioner comprises a valve feedback sensor, an internal drive, and a current-to-pneumatic converter.

3. An actuator assembly, comprising:

a pneumatic actuator; and a transfer station coupled to the pneumatic actuator, comprising:

a single-body manifold configured to be used as a coupling interface between the pneumatic actuator and a valve positioner, the manifold defining first, second, and third flow paths and first and second ports coupled to the second flow path, the first port to be coupled to a first pressure gauge, the second port to be coupled to a second pressure gauge, the first flow path to couple a supply pressure and the valve positioner, the second flow path to couple the valve positioner and the pneumatic actuator, and the third flow path to couple the first flow path and the second flow path to bypass the valve positioner without disrupting a process loop including the valve positioner;

first, second, and third fluid flow control devices positioned within the manifold to control the fluid flow through the respective ones of the first, second, and third flow paths, the second fluid flow control device positioned between the first and second ports; and a switching system communicatively coupled to the fluid flow control devices to determine respective positions of the fluid flow control devices.

4. The actuator assembly of claim 3, further comprising a regulator to enable manual control of the process loop when the valve positioner is bypassed.

5. The actuator assembly of claim 3, wherein the switching system is to enable fluid flow control between fluid flowing to the valve positioner or another valve positioner, fluid flowing through the valve positioner or the other valve positioner, and fluid flow bypassing the valve positioner or the other valve positioner.

6. The actuator assembly of claim 5, wherein fluid flowing to the valve positioner or the other valve positioner is associated with a balance operation mode in which supply pressure flows into the valve positioner or the other valve positioner to enable an output pressure of the valve positioner or the other valve positioner to be made similar to a pressure within a flow path flowing to the pneumatic actuator.

7. The actuator assembly of claim 5, wherein fluid flowing through the valve positioner or the other valve positioner is associated with a normal operation mode.

8. The actuator assembly of claim 5, wherein fluid flow bypassing the valve positioner is associated with a bypass operation mode that enables the valve positioner to be repaired or replaced.

9. A transfer station for use with a valve positioner, the transfer station comprising:

a single-body manifold configured to be used as a coupling interface between the valve positioner and an actuator, the manifold defining first, second, and third flow paths, the first flow path comprising a first inlet and a first outlet, the first inlet to be coupled to a supply pressure, the first outlet to be coupled to the valve positioner, the first flow path enabling fluid to flow from the supply pressure to the valve positioner during a normal operation mode, the second flow path comprising a second inlet and a second outlet, the second inlet to be coupled to the valve positioner, the second outlet to be coupled to the actuator, the second flow path enabling fluid to flow from the valve positioner to the actuator during the normal operation mode, and the third flow path enabling fluid to flow between the first and second flow paths during a bypass operation mode that bypasses the valve positioner, the manifold further comprises a first port coupled to the second flow path and a second port coupled to the second flow path, the first port to be coupled to a first pressure gauge, the second port to be coupled to a second pressure gauge;

a first fluid flow control device positioned within the manifold to control fluid flow between the supply pressure and the valve positioner during the normal operation mode;

a second fluid flow control device positioned within the manifold to control fluid flow between the valve positioner and the actuator during the normal operation mode, the second fluid flow control device positioned between the first and second ports;

a third fluid flow control device positioned within the manifold to control fluid flow between the first and second flow paths during the bypass operation mode, the bypass operation mode enabling manual control of a process loop while the valve positioner is not controlling the process loop; and a switching system communicatively coupled to the first, second, and third fluid flow control devices to determine respective positions of the first, second, and third fluid flow control devices based on the transfer station being in the normal operation mode or the bypass operation mode.

10. The transfer station of claim 9, wherein the manifold does not include a vent to atmosphere.

11. The transfer station of claim 9, further comprising a third port to receive a pressure gauge to enable a pressure within the first flow path to be monitored.

12. The transfer station of claim 9, further comprising a regulator to enable the manual control of the process loop during the bypass operation mode.

13. The transfer station of claim 12, wherein the regulator is coupled to the third flow path.

14. The transfer station of claim 12, wherein the regulator is internal to the manifold.

15. The transfer station of claim 12, wherein the regulator is positioned within the manifold.

16. The transfer station of claim 9, wherein the switching system is to control a balance operation mode in which supply fluid to flow out of the positioner is balanced with fluid flowing through the third flow path.

17. The transfer station of claim 16, wherein the balance operation mode enables an output pressure of the valve positioner or another valve positioner to be made similar to a pressure within the third flow path prior to the valve positioner or the other valve positioner controlling the process loop in the normal operation mode.

* * * * *